(12) United States Patent
Murray et al.

(10) Patent No.: US 10,945,051 B1
(45) Date of Patent: Mar. 9, 2021

(54) SYSTEM AND METHOD FOR INTENTIONALLY DISTORTING DIGITAL MEDIA TO REDUCE THE ACCURACY OF GENERATIVE MACHINE LEARNING ALGORITHMS

(71) Applicant: Bank of America Corporation, Charlotte, NC (US)

(72) Inventors: Matthew Bruce Murray, Roanoke, TX (US); Garrett Thomas Botkin, Charlotte, NC (US); Kathleen D. Schaumburg, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/841,031

(22) Filed: Apr. 6, 2020

(51) Int. Cl.
*H04N 21/8358* (2011.01)
*G06N 20/20* (2019.01)
*G06N 3/08* (2006.01)
*G06N 3/04* (2006.01)

(52) U.S. Cl.
CPC ....... *H04N 21/8358* (2013.01); *G06N 3/0454* (2013.01); *G06N 3/088* (2013.01); *G06N 20/20* (2019.01)

(58) Field of Classification Search
USPC ................................................. 386/239–262
See application file for complete search history.

(56) References Cited

U.S. PATENT DOCUMENTS

| | | |
|---|---|---|
| 5,337,157 A | 8/1994 | Nakata |
| 5,842,191 A | 11/1998 | Stearns |
| 5,953,417 A | 9/1999 | Quan |
| 6,072,894 A | 6/2000 | Payne |
| 6,131,161 A | 10/2000 | Linnartz |
| 6,173,271 B1 | 1/2001 | Goodman et al. |
| 7,302,160 B1 | 11/2007 | Wells |
| 7,328,453 B2 | 2/2008 | Merkle, Jr. et al. |
| 7,369,677 B2 | 5/2008 | Petrovic et al. |
| 7,375,765 B2 | 5/2008 | Kudou |
| 7,616,776 B2 | 11/2009 | Petrovic et al. |

(Continued)

OTHER PUBLICATIONS

Guera et al, Deepfake Video Detection Using Recurrent Neural Networks, Video and Image Processing Laboratory (VIPER), Purdue University, 6 pages, Nov. 2018. (Year: 2018).*

*Primary Examiner* — Hung Q Dang

(74) *Attorney, Agent, or Firm* — Michael A. Springs

(57) ABSTRACT

An apparatus includes a processor that monitors transmissions destined for an external network, determines that a transmission includes original media associated with a subject, and intercepts the transmission before it reaches the external network. The processor generates modified media by selecting a subset of data elements of the original media and replacing a value of each data element of the subset with a new value. At least one of the subset of data elements and the set of new values is chosen such that an accuracy metric calculated for a first generative algorithm, trained to generate synthetic representations of the subject based on modified media, is less than, by a given factor, the accuracy metric calculated for a second generative algorithm, trained to generate synthetic representations of the subject based on original media. The processor replaces the transmission with a new transmission that includes the modified media.

20 Claims, 5 Drawing Sheets

(56) References Cited

U.S. PATENT DOCUMENTS

| | | |
|---|---|---|
| 7,665,131 B2 | 2/2010 | Goodman et al. |
| 8,161,540 B2 | 4/2012 | Mantripragada et al. |
| 8,478,048 B2 | 7/2013 | Ding et al. |
| 8,527,771 B2 | 9/2013 | Candelore |
| 8,388,744 B1 | 11/2013 | Vendrow et al. |
| 8,717,857 B2 | 5/2014 | Spitzlinger et al. |
| 8,850,597 B1 | 9/2014 | Gates et al. |
| 9,105,141 B2 | 8/2015 | Okada et al. |
| 9,477,826 B2 | 10/2016 | Turgeman et al. |
| 9,531,733 B2 | 12/2016 | Turgeman et al. |
| 9,536,097 B2 | 1/2017 | Anderson et al. |
| 9,659,185 B2 | 5/2017 | Elovici et al. |
| 9,690,915 B2 | 6/2017 | Turgeman et al. |
| 9,940,508 B2 | 4/2018 | Kaps et al. |
| 10,262,236 B2 | 4/2019 | Lim et al. |
| 10,509,304 B2 | 12/2019 | Chien |
| 2006/0251252 A1 | 11/2006 | Quan |
| 2013/0011006 A1 | 1/2013 | Petrovic et al. |
| 2014/0177914 A1 | 6/2014 | Kuehnle et al. |
| 2014/0317744 A1 | 10/2014 | Turgeman et al. |
| 2014/0344927 A1 | 11/2014 | Turgeman et al. |
| 2015/0040220 A1 | 2/2015 | Mantripragada et al. |
| 2017/0140663 A1 | 5/2017 | Sadeh-Koniecpol et al. |
| 2018/0268222 A1 | 9/2018 | Sohn et al. |
| 2018/0341878 A1 | 11/2018 | Azout et al. |
| 2019/0122072 A1 | 4/2019 | Cricri et al. |
| 2019/0147333 A1 | 5/2019 | Kumar et al. |
| 2019/0236614 A1 | 8/2019 | Burgin et al. |
| 2019/0278378 A1 | 9/2019 | Yan et al. |
| 2019/0355128 A1 | 11/2019 | Grauman et al. |
| 2019/0372778 A1* | 12/2019 | Palaniappan ......... H04L 9/3231 |
| 2020/0065526 A1 | 2/2020 | Berman |
| 2020/0272748 A1* | 8/2020 | Davidson ............ G06F 21/6209 |
| 2020/0285683 A1* | 9/2020 | David ................ G06F 16/9538 |
| 2020/0327410 A1* | 10/2020 | Fairhart ................... G06N 3/04 |

\* cited by examiner

SYSTEM AND METHOD FOR INTENTIONALLY DISTORTING DIGITAL MEDIA TO REDUCE THE ACCURACY OF GENERATIVE MACHINE LEARNING ALGORITHMS

TECHNICAL FIELD

The present disclosure relates generally to artificial intelligence, and more particularly, to a system and method for intentionally distorting digital media to reduce the accuracy of generative machine learning algorithms.

BACKGROUND

Generative algorithms are a class of machine learning algorithms trained on sets of real data, to generate instances of synthetic data that are passably similar to the real data. Such algorithms are widely used in the fields of image generation, video generation, and voice generation. While generative algorithms may be employed in a variety of beneficial ways—such as for text-to-image translation, facial aging, 3D object generation, and image resolution enhancement, among others—they may also be used by bad actors to mislead consumers of digital media. For example, a generative machine learning algorithm may be used to edit a video of an individual speaking to make it appear as though the individual said something that he/she did not actually say. Such "deepfakes" are becoming increasingly difficult to recognize.

SUMMARY

Public facing organizations are particularly susceptible to deepfakes, due to the large quantities of original media (in the form of news releases and promotional materials, among others) that they typically provide to the public. While the release of such original media may be helpful in informing the public about organizational operations and opportunities, it may also provide bad actors with a wealth of training data that may be used to train generative machine learning algorithms designed to create deepfakes. Such deepfakes may then be used to spread disinformation about the organization. Currently, few options exist for organizations to protect themselves against the threat of deepfakes. For example, declining to release original media to the public is typically not a feasible option. As another example, while tools aimed at detecting deepfakes exist, the technology used to generate deepfakes is continually evolving/improving, making detection increasingly difficult. Furthermore, even if a deepfake is ultimately detected, it may nevertheless cause significant damage to an organization prior to detection.

This disclosure contemplates a digital media distortion tool designed to help protect an organization against the threat of deepfakes by intentionally distorting original media released to the public by the organization. The tool distorts the media in such a way that the accuracy of generative machine learning algorithms trained to generate synthetic media based on the original media released by the organization is reduced. Accordingly, certain embodiments reduce the total number of deepfakes relating to the organization that are generated and/or increase the ease with which any generated deepfakes may be identified. Certain embodiments of the tool are described below.

According to one embodiment, an apparatus includes a memory and a hardware processor communicatively coupled to the memory. The hardware processor monitors transmissions originating on an internal network and destined for an external network. The processor also determines that a transmission of the transmissions includes an original piece of media associated with a subject. The original piece of media includes a set of data elements. Each data element of the set of data elements includes a value that lies between a minimum value and a maximum value. In response to determining that the transmission includes the original piece of media associated with the subject, the processor intercepts the transmission comprising the original piece of media before the transmission reaches the external network. The processor additionally generates a modified piece of media by applying a media modification process to the original piece of media. The media modification process includes selecting a subset of data elements from the set of data elements of the original piece of media. For each data element of the subset of data elements, the media modification process also includes replacing a value of the data element with a new value of a set of new values. The new value lies between the minimum value and the maximum value. At least one of the subset of data elements and the set of new values is chosen such that a first value of an accuracy metric calculated for a first generative machine learning algorithm is less than, by a given factor, a second value of the accuracy metric calculated for a second generative machine learning algorithm. The first generative machine learning algorithm includes a generative model trained to generate media comprising synthetic representations of the subject based on media associated with the subject and modified according to the media modification process. The second generative machine learning algorithm includes the generative model trained to generate synthetic representations of the subject based on the media associated with the subject, unmodified according to the media modification process. The processor further replaces the transmission with a new transmission destined for the external network. The new transmission includes the modified piece of media.

According to another embodiment, a method includes monitoring transmissions originating on an internal network and destined for an external network. The method also includes determining that a transmission of the transmissions comprises an original piece of media associated with a subject. The original piece of media includes a set of data elements. Each data element of the set of data elements includes a value that lies between a minimum value and a maximum value. In response to determining that the transmission includes the original piece of media associated with the subject, the method includes intercepting the transmission comprising the original piece of media before the transmission reaches the external network. The method additionally includes generating a modified piece of media by applying a media modification process to the original piece of media. The media modification process includes selecting a subset of data elements from the set of data elements of the original piece of media. For each data element of the subset of data elements, the media modification process also includes replacing a value of the data element with a new value of a set of new values. The new value lies between the minimum value and the maximum value. At least one of the subset of data elements and the set of new values is chosen such that a first value of an accuracy metric calculated for a first generative machine learning algorithm is less than, by a given factor, a second value of the accuracy metric calculated for a second generative machine learning algorithm. The first generative machine learning algorithm includes a generative model trained to generate media comprising synthetic representations of the subject based on media associated with the subject and modified according to the media modification process. The second generative machine learning algorithm includes the generative model trained to generate synthetic representations of the subject based on the media associated with the subject, unmodified according to the media modification process. The method further includes replacing the transmission with a new transmission destined for the external network. The new transmission includes the modified piece of media.

According to a further embodiment, a non-transitory computer-readable medium includes instructions that are configured, when executed by a hardware processor, to monitor transmissions originating on an internal network and destined for an external network. The instructions are also configured, when executed by the hardware processor, to determine that a transmission of the transmissions includes an original piece of media associated with a subject. The original piece of media includes a set of data elements. Each data element of the set of data elements includes a value that lies between a minimum value and a maximum value. In response to determining that the transmission includes the original piece of media associated with the subject, the instructions are configured, when executed by the hardware processor, to intercept the transmission comprising the original piece of media before the transmission reaches the external network. The instructions are additionally configured, when executed by the hardware processor, to generate a modified piece of media by applying a media modification process to the original piece of media. The media modification process includes selecting a subset of data elements from the set of data elements of the original piece of media. For each data element of the subset of data elements, the media modification process also includes replacing a value of the data element with a new value of a set of new values. The new value lies between the minimum value and the maximum value. At least one of the subset of data elements and the set of new values is chosen such that a first value of an accuracy metric calculated for a first generative machine learning algorithm is less than, by a given factor, a second value of the accuracy metric calculated for a second generative machine learning algorithm. The first generative machine learning algorithm includes a generative model trained to generate media comprising synthetic representations of the subject based on media associated with the subject and modified according to the media modification process. The second generative machine learning algorithm includes the generative model trained to generate synthetic representations of the subject based on the media associated with the subject, unmodified according to the media modification process. The instructions are further configured, when executed by the hardware processor, to replace the transmission with a new transmission destined for the external network. The new transmission includes the modified piece of media.

Certain embodiments provide one or more technical advantages. As an example, an embodiment improves the security of an organization's media, by automatically identifying media at risk for use by a generative machine learning algorithm in generating synthetic media adverse to the organization, and preventing such media from reaching an external network, unmodified. As another example, an embodiment reduces the accuracy of generative machine learning algorithms by modifying data elements of the media used to train such algorithms using parameters specifically chosen to achieve the reduction in accuracy. As a further example, an embodiment conserves processing resources otherwise expended by an organization's computer and network systems on deepfake detection efforts, by reducing the accuracy of generative machine learning algorithms in generating synthetic media related to the organization, such that both the number and the quality of deepfakes related to the organization are reduced. The system described in the present disclosure may particularly be integrated into a practical application of an edge device, located at the boundary of an organization's internal network and an external, public network. The edge device may be configured to monitor transmissions originating on the internal network and destined for the external network, to identify transmissions that include media at risk for use by a generative machine learning algorithm in generating synthetic media adverse to the organization. The device may automatically intercept such transmissions and modify the included media, in a manner specifically chosen to reduce the accuracy of a generative machine learning algorithm trained using the modified media.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages may be understood by referring to FIGS. 1 through 5 of the drawings, like numerals being used for like and corresponding parts of the various drawings.

I. System Overview

Figure 1:
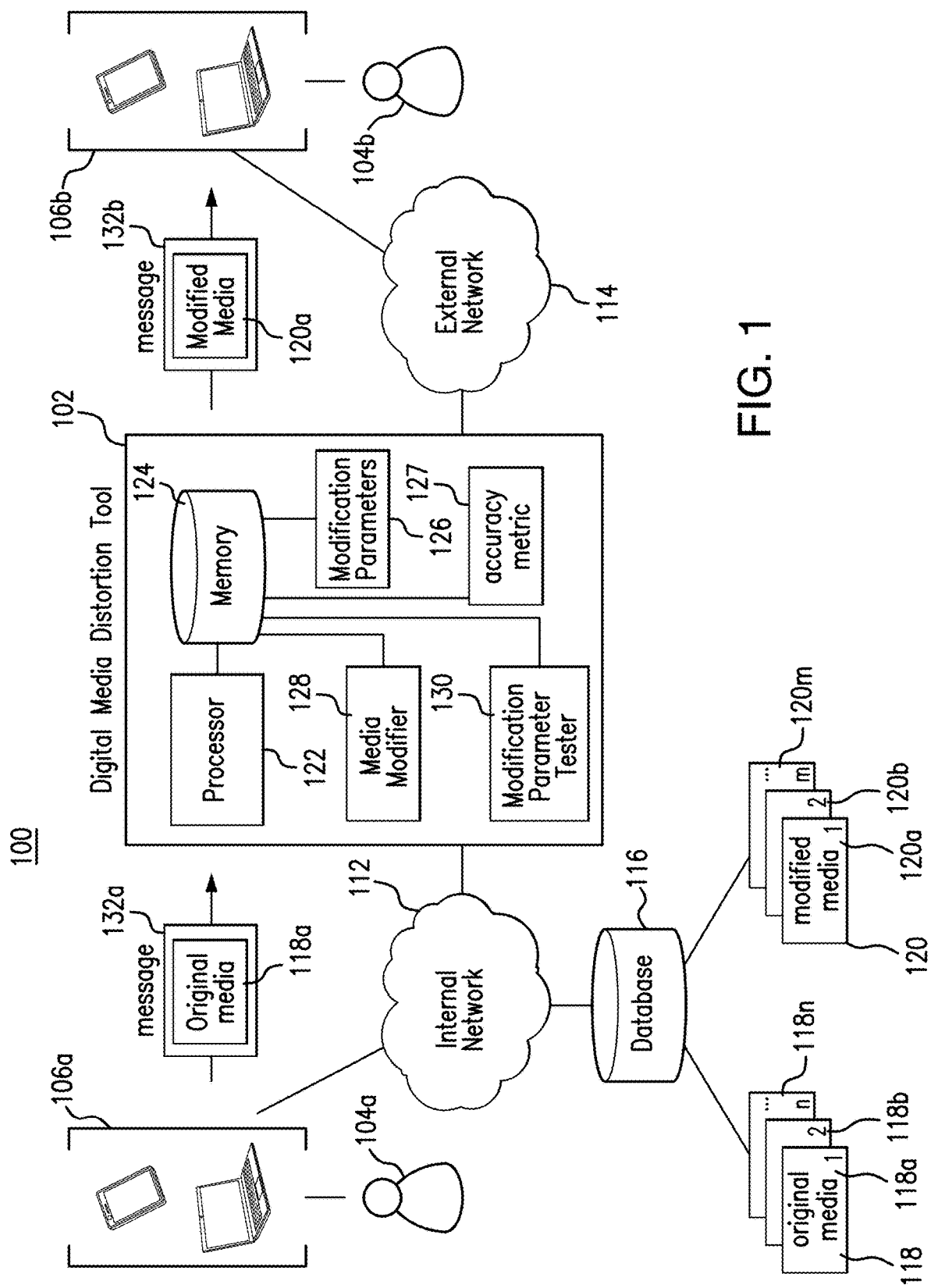
FIG. 1 illustrates an example digital media distortion system.

FIG. 1 illustrates an example system 100 that includes digital media distortion tool 102, user(s) 104, device(s) 106, internal network 112, external network 114, and database 116. Generally, digital media distortion tool 102 modifies original media 118, generated and/or stored by an organization on internal network 112, to produce modified media 120. This disclosure contemplates that an organization may include any number of individuals (including a single individual), who may generate and/or store original media 118 for any reason (including personal use). When the organization wishes to distribute the media to the public, digital media distortion tool 102 transmits modified media 120 over external network 114, rather than original media 118. The manner by which digital media distortion tool 102 modifies original media 118 to generate modified media 120 is chosen such that a generative machine learning model trained using modified media 120 is less accurate at generating synthetic media of the subject of the original/modified media than a generative machine learning model trained using original media 118. Accordingly, certain embodiments help to protect organizations that disseminate original media to the public from bad actors seeking to use the original media to generate deepfakes. For example, in certain embodiments, attempts to use the modified media to train a generative machine learning model to generate synthetic media associated with a subject of the original/modified media (e.g., an individual depicted in the original/modified media, an individual speaking in the original/modified media, etc.) may fail. In some embodiments, attempts to use the modified media to train a generative machine learning model to generate synthetic media associated with a subject of the original media may lead to synthetic media that is easily distinguishable from real, original media. The manner by which digital media distortion tool 102 performs such tasks will be described in further detail below, in the discussion of FIGS. 2 through 5.

Devices 106a are used by internal users 104a located on internal network 112. As an example, in certain embodiments, devices 106a may be used by users 104a to generate original media 118. For example, devices 106a may be used to capture images, video, audio, and/or digital handwriting samples. As another example, in certain embodiments, devices 106a may be used by users 104a to send messages 132a destined for users 104b, located on external network 114. Messages 132a may include original media 118a generated on internal network 112. For example, messages 132a may include original media 118a that has not yet been released to the public. In such embodiments, digital media distortion tool 102 may be configured to intercept such messages 132a, prior to original media 118a reaching external network 114. As another example, in some embodiments, devices 106a may be used by users 104a to request that digital media distortion tool 102 operate on original media files 118, stored in database 116.

Devices 106b are used by external users 104b located on external network 114. For example, devices 106b may be used to receive messages 132b from digital media distortion tool 102 that include modified media 120a. Modified media 120a is a modified version of original media 118a. Examples of various modifications that may be performed by digital media distortion tool 102 on original media 118a to generate modified media 120a are described in further detail below, in the discussion of FIG. 2.

Devices 106 include any appropriate device for communicating with components of system 100 over internal network 112 and/or external network 114. For example, devices 106 may be a telephone, a mobile phone, a computer, a laptop, a wireless or cellular telephone, a tablet, a server, and IoT device, and/or an automated assistant, among others. This disclosure contemplates devices 106 being any appropriate device for sending and receiving communications over internal network 112 and/or external network 114. Device 106 may also include a user interface, such as a display, a microphone, keypad, or other appropriate terminal equipment usable by user 104. In some embodiments, an application executed by a processor of device 106 may perform the functions described herein.

Internal network 112 facilitates communication between and amongst the various components of system 100 located outside of external network 114 (e.g., devices 106a, database 116, and digital media distortion tool 102). This disclosure contemplates internal network 112 being any suitable network operable to facilitate communication between such components of system 100. Internal network 112 may include any interconnecting system capable of transmitting audio, video, signals, data, messages, or any combination of the preceding. Internal network 112 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

External network 114 facilitates communication between and amongst the various components of system 100 located outside of internal network 112 (e.g., digital media distortion tool 102 and devices 106b). This disclosure contemplates external network 114 being any suitable network operable to facilitate communication between such components of system 100. External network 114 may include any interconnecting system capable of transmitting audio, video, signals, data, messages, or any combination of the preceding. External network 114 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 116 stores original media 118. Original media 118 includes any media for which an organization seeks to protect the subject(s) of the media against the generation of deepfakes associated with the subject(s). As an example, original media 118 may include any media generated on internal network 112. For example, original media 118 may include media generated on internal network 112 that has not yet been released to the public (e.g., has not been transmitted over external network 114). Original media 118 may also include any media that relates to subjects associated with the organization to which digital media distortion tool 102 belongs. For example, original media 118 may include images, video, audio, and/or digital handwriting samples of the organization's employees, managers, executives, and/or any other individuals associated with the organization. As another example, original media 118 may include images and/or video of one or more of the organization's locations. For example, original media 118 may include video of the inside of the organization's headquarters.

In certain embodiments, database 116 stores modified media 120. Each piece of modified media 120a corresponds to a piece of original media 118a. Modified media 120a differs from original media 118a in that modified media 120a includes one or more data elements whose values have been modified as compared to original media 118a. As an example, where original media 118a is an image or video, modified media 120a may include one or more pixels with brightness values and/or color values that have been modified as compared to original media 118a. As another example, where original media 118a is an audio sample, modified media 120a may include one or more audio signals with frequency and/or loudness values that have been modified as compared to original media 118a. Examples of the manner by which digital media distortion tool 102 modifies the data elements of original media 118 to generate modified media 120 are described in further detail below, in the discussion of FIG. 2. In some embodiments, database 116 may store modified media 120 in addition to original media 118. As an example, in certain embodiments, digital media distortion tool 102 may automatically detect when new original media 118 is generated on internal network 112 and stored in database 116 and automatically generate modified media 120. As another example, in certain embodiments, digital media distortion tool 102 may generate modified media 120 from original media 118 in response to a request from user 104a to generate modified media 120. In certain embodiments, database 116 may store modified media 120 instead of original media 118. For example, in certain embodiments, when a user 104a attempts to save an original piece of media 118 to database 116, digital media distortion tool 102 may modify the original piece of media to generate a modified piece of media 120, and only allow user 104a to save modified media 120 to database 116.

As seen in FIG. 1, digital media distortion tool 102 includes a processor 122 and a memory 124. This disclosure contemplates processor 122 and memory 124 being configured to perform any of the functions of digital media distortion tool 102 described herein. Generally, digital media distortion tool 102 modifies original media 118 to generate modified media 120. In particular, digital media distortion tool 102 implements media modifier 128 to modify a subset of the data elements of a piece of original media 118a, according to modification parameters 126 stored in memory 124, to generate a piece of modified media 120a. Modification parameters 126 may specify the subset of data elements of a piece of original media 118a that media modifier 128 is to modify and/or the set of new values that media modifier 128 is to use to replace the original values of the subset of data elements selected for modification. Specific examples of modification parameters 126 and the manner by which media modifier uses modification parameters 126 to modify original media 118 are presented in detail below, in the discussion of FIGS. 2 and 3.

By distorting original media 118 to generate modified media 120, digital media distortion tool 102 may protect the subjects of original media 118 from deepfakes. In particular, in certain embodiments, a generative machine learning model trained using modified media 120 will be less accurate at generating synthetic media of the subject of the original/modified media than a generative machine learning model trained using original media 118. For example, consider a situation where the generative machine learning model is a generative adversarial neural network. When modified media 120 is used to train the neural network, the new, distorted values in the modified media 120 (as compared to original media 118) distort the results of the consequent matrices that are passed through each layer of the network. Accordingly, the mathematical operations that are performed on these new values degrade the neural network's ability to distill information, given that the values that are passed through the neural network no longer accurately describe the original media 118.

In order to help ensure that modified media 120 is sufficiently distorted, as compared with original media 118, to help protect the subjects of the modified media from deepfake generation, modification parameters 126 are chosen such that a first value of an accuracy metric 127 calculated for a first generative machine learning algorithm is less than, by a given factor, a second value of the accuracy metric 127 calculated for a second generative machine learning algorithm, where the first generative machine learning algorithm was created by training a generative model to generate synthetic representations of a subject based on modified media 120 of the subject and the second generative machine learning algorithm was created by training the same generative model to generate synthetic representations of the subject using original media 118 of the subject rather than modified media 120. Here, the generative model considered may be any generative model for which protection against synthetic media generation is sought. In certain embodiments, multiple generative models may be considered. For example, digital media distortion tool 102 may receive a request from user 104a to consider a new generative model in response to a discovery that the new generative model is being used by bad actors to generate deepfakes. In such embodiments, modification parameters 126 are chosen such that for each generative model under consideration, a first value of the accuracy metric 127 calculated for a first generative machine learning algorithm generated by training the generative model using modified media 120 is less than, by a given factor, a second value of the accuracy metric 127 calculated for a second generative machine learning algorithm generated by training the generative model using original media 118. This disclosure contemplates that accuracy metric 127 may be any suitable metric (quantitative or qualitative) capable of providing a measure of the accuracy of a generative machine learning model in generating synthetic representations of a subject. For example, in certain embodiments, accuracy metric 127 could be an average log-likelihood metric, an inception score metric, the Fréchet Inception Distance, a metric related to a Turing-like test, and/or any other suitable metric. As a specific example, in certain embodiments, accuracy metric 127 may be calculated by presenting one or more users 104a with both multiple instances of synthetic media generated by a generative machine learning algorithm and multiple instances of original media 118 of the subject and measuring the accuracy rate of the users in classifying the media as either real or fake.

To help ensure that modification parameters 126 are such that the above accuracy metric requirement is satisfied, in certain embodiments, digital media distortion tool 102 additionally implements modification parameter tester 130 to test and/or alter modification parameters 126. For example, digital media distortion tool 102 may implement modification parameter tester 130 to (1) train a generative model using both original media 118 and modified media 120 to generate a pair of generative algorithms, (2) calculate values for accuracy metric 127 for both the generative algorithm trained using original media 118 and the generative algorithm trained using modified media 120, and (3) compare the two calculated values of accuracy metric 127 to determine whether modification parameters 126 satisfy the above accuracy metric requirement. Further details of the manner by which digital media distortion tool 102 implements modification parameter tester 130 to test modification parameters 126 are presented below, in the discussion of FIG. 4.

In certain embodiments, digital media distortion tool 102 modifies original media 118 in response to receiving a request from user 104a to modify original media 118. In some embodiments, digital media distortion tool 102 automatically modifies original media 118. As an example, digital media distortion tool 102 may automatically modify original media 118 to generate modified media 120 each time a user 104a stores (or attempts to store) original media 118 in database 116. As another example, digital media distortion tool 102 may monitor transmissions originating on local network 114 and destined for external network 116 for any original media 118. Digital media distortion tool 102 may then automatically modify original media 118 before the media reaches external network 116. In certain embodiments, rather than modifying all original media 118 destined for external network 116, digital media distortion tool 102 may modify original media 118 that satisfies certain conditions. For example, digital media distortion tool 102 may modify original media 118 that is associated with certain subjects. As an example, in certain embodiments, digital media distortion tool 102 may modify original media 118 that is associated with an organization's high-level executives, while leaving other original media 118, generated within the organization, unmodified. In certain embodiments, digital media distortion tool 102 may determine that a piece of original media 118 is associated with a given subject using a machine learning classification algorithm. In some embodiments, digital media distortion tool 102 may assign a sensitivity index to each piece of original media 118 and determine whether or not to modify original media 118 based on whether the assigned sensitivity index is greater than a set sensitivity threshold. For example, digital media distortion tool 102 may assign a sensitivity index to each piece of original media 118 based on the subject associated with the piece of media and/or the destination of the transmission containing the piece of media. For instance, an original piece of media 118 depicting a high-level executive may be assigned a higher sensitivity index than an original piece of media 118 depicting an entry-level employee. Similarly, an original piece of media 118 destined for a trusted device 106*b* may be assigned a lower sensitivity index than an original piece of media 118 destined for an unknown device 106*b* (e.g., an original piece of media 118 uploaded to the internet for download by any device 106*b*).

Processor 122 is any electronic circuitry, including, but not limited to microprocessors, application specific integrated circuits (ASIC), application specific instruction set processor (ASIP), and/or state machines, that communicatively couples to memory 124 and controls the operation of digital media distortion tool 102. Processor 122 may be 8-bit, 16-bit, 32-bit, 64-bit or of any other suitable architecture. Processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 122 may include other hardware and software that operates to control and process information. Processor 122 executes software stored on memory to perform any of the functions described herein. Processor 122 controls the operation and administration of digital media distortion tool 102 by processing information received from internal network 112, device(s) 106, database 116, and memory 124. Processor 122 may be a programmable logic device, a microcontroller, a microprocessor, any suitable processing device, or any suitable combination of the preceding. Processor 122 is not limited to a single processing device and may encompass multiple processing devices.

Memory 124 may store, either permanently or temporarily, data, operational software, or other information for processor 122. Memory 124 may include any one or a combination of volatile or non-volatile local or remote devices suitable for storing information. For example, memory 124 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 124, a disk, a CD, or a flash drive. In particular embodiments, the software may include an application executable by processor 122 to perform one or more of the functions described herein.

In certain embodiments, memory 124 may also store a set of modification parameters 126 and instructions for calculating accuracy metric 127. Modification parameters 126 include parameters that may be used by digital media distortion tool 102 to modify pieces of original media 118 to generate modified pieces of media 120. Modification parameters 126 may include parameters that may be used by digital media distortion tool 102 to modify images, videos, audio samples, and/or handwriting samples. As an example, in certain embodiments, modification parameters 126 may specify a percentage of the total number of pixels of an image for which digital media distortion tool 102 should replace the brightness values of the pixels with randomly generated brightness values. Further examples of modification parameters 126 and the manner by which digital media distortion tool 102 uses modification parameters 126 to generate modified media 120 are described in further detail below, in the discussion of FIGS. 2 and 3.

As described above, accuracy metric 127 may be any suitable metric (quantitative or qualitative) capable of providing a measure of the accuracy of a generative machine learning model in generating synthetic representations of a subject. For example, in certain embodiments, accuracy metric 127 could be an average log-likelihood metric, an inception score metric, the Fréchet Inception Distance, a metric related to a Turing-like test, and/or any other suitable metric.

Modifications, additions, or omissions may be made to the systems described herein without departing from the scope of the invention. For example, system 100 may include any number of users 104, devices 106, internal networks 112, external networks 114, and databases 116. The components may be integrated or separated. Moreover, the operations may be performed by more, fewer, or other components. Additionally, the operations may be performed using any suitable logic comprising software, hardware, and/or other logic.

II. Media Modification Examples

Figure 2:
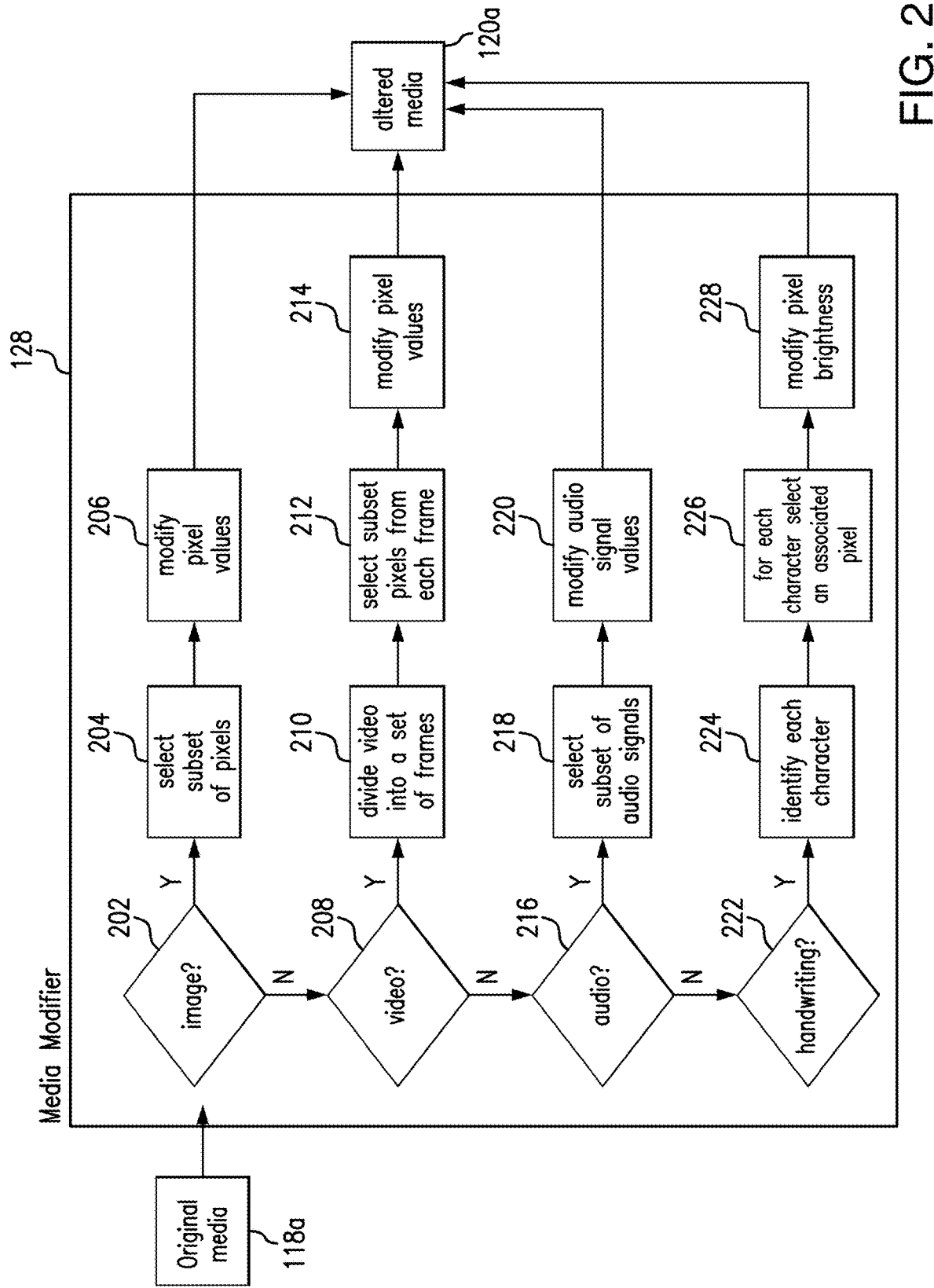
FIG. 2 illustrates a media modifier component of a digital media distortion tool of the system of FIG. 1.

FIG. 2 illustrates an example of the operation of media modifier 128 of digital media distortion tool 102. Media modifier 128 may be a sub-processing component of digital media distortion tool 102. For example, media modifier 128 may include non-transitory computer readable instructions stored in memory 124 and executed by processor 122. Media modifier 128 is configured to operate on an original piece of media 118, where original piece of media 118 includes a set of data elements. As an example, when original piece of media 118 is an image, the set of data elements includes the values of the pixels that form the image. As another example, when original piece of media 118 is a video, the set of data elements includes the values of the pixels that form each frame of the video. As another example, when original piece of media 118 is an audio sample, the set of data elements includes the audio signals that form the audio sample. As a further example, when original piece of media 118 is a handwriting sample, the set of data elements includes the values of the pixels associated with any alphanumeric characters included in the handwriting sample.

In general, media modifier 128 is configured to select a subset of data elements of the set of data elements that make up a piece of original media 118 and to modify the piece of original media 118 by replacing values of the data elements of the subset of data elements with new values. In certain embodiments, each new value is chosen to fall between the minimum value and the maximum value attained by the data elements that make up the original piece of media 118. As an example, where original media 118 is an image or video, media modifier 128 may be configured to modify original media 118 by replacing the brightness values of a subset of the pixels that form the image with new brightness values, where the new brightness values are chosen to fall between the minimum brightness value of any of the pixels in the original image and the maximum brightness value of any of the pixels in the original image. As another example, media modifier may be configured to modify original media 118 by replacing the color values (e.g., the red, green, and/or blue values) of a subset of the pixels that form the image with new color values. As another example, media modifier may be configured to modify original media 118 by swapping the values of the pixels of a subset of the pixels that form the image with one another. As another example, media modifier may be configured to modify original media 118 by deleting pixels and/or adding pixels. As a further example, where original media 118 is an audio sample, media modifier 128 may be configured to modify original media 118 by replacing the frequency and/or loudness values of a subset of the audio signals that form the audio sample with new frequency and/or loudness values.

In certain embodiments, the subset of data elements chosen from the set of data elements that make up a piece of original media 118 and the new values chosen to replace the original values of the data elements of the subset of data elements are chosen based on modification parameters 126 stored in memory 124. Modification parameters 126 may depend on the type of original media 118 to be modified. Accordingly, when media modifier 128 receives a piece of original media 118a for modification, it first identifies a type for original media 118a. For example, as illustrated in FIG. 2, in step 202 media modifier 128 first determines whether original media 118 is an image. If, in step 202 media modifier 128 determines that original media 118 is not an image, in step 208 media modifier 128 determines whether original media 118 is a video. If, in step 208 media modifier 128 determines that original media 118 is not a video, in step 216 media modifier 128 determines whether original media 118 is an audio sample. If, in step 216 media modifier 128 determines that original media 118 is not an audio sample, in step 222 media modifier 128 determines whether original media 118 is a handwriting sample.

This disclosure contemplates that media modifier 128 may modify original media 118a in any suitable manner, such that the accuracy of generative machine learning algorithms trained to generate synthetic media based on original media 118a is reduced. Several example modifications are presented below.

a. Images

If, in step 202 media modifier 128 determines that original media 118a is an image, in step 204 media modifier 128 selects a subset of pixels from the set of all the pixels forming the image. In certain embodiments, media modifier 128 may randomly select a subset of pixels from the set of all the pixels forming the image. For example, modification parameters 126 may specify a certain percentage of the total number of pixels to modify, and media modifier 128 may then randomly select a certain number of pixels to satisfy the specified percentage. As a specific example, modification parameters 126 may specify that media modifier 128 should modify 1% of the pixels in each original image 118. Accordingly, when operating on an image of dimension 1800 pixels by 1200 pixels, media modifier 128 may select a subset of 21,600 pixels to modify. Modification parameters 126 may specify any suitable percentage of the total number of image pixels to modify. For example, in certain embodiments, the percentage may lie between 1% and 5%. In certain embodiments, rather than randomly selecting a subset of pixels from the set of all the pixels forming the image, media modifier 128 may first identify a set of pixels forming the subject of the image and then randomly select, for modification, a subset of those pixels. For example, if an original image 118a depicts a high-level executive, media modifier 128 may first identify those pixels forming the image of the executive (as opposed to the image background) and then randomly select a subset of the identified pixels. In certain embodiments, media modifier 128 may identify those pixels forming the subject of the image using a machine learning algorithm trained to separate those pixels forming the subject of the image from those pixels forming the background of the image. Additionally, this disclosure contemplates that media modifier 128 may select the subset of pixels from the set of all the pixels forming original media 118a according to any suitable pattern stored in modification parameters 126.

After selecting a subset of pixels for modification, in step 206 media modifier 128 modifies a value of each pixel of the selected subset of pixels. As an example, in certain embodiments, media modifier 128 may modify the brightness of each pixel of the selected subset of pixels by replacing the brightness value of the pixel with a new, randomly chosen brightness value. For example, for each pixel of the subset of pixels, media modifier 128 may use a random number generator to randomly generate a value between 0 and 1, scale the randomly generated value so that is lies between the minimum brightness value of all of the pixels forming original image 118a and the maximum brightness value of all of the pixels forming original image 118a, and replace the original brightness value of the pixel with the new, randomly generated and scaled value. As another example, in certain embodiments, media modifier 128 may modify the color of each pixel of the selected subset of pixels by replacing the red, green, and/or blue values of the pixel with a new, randomly chosen values. As another example, in certain embodiments, media modifier 128 may modify the value of each pixel of the selected subset of pixels by swapping the value of the pixel with the value of another pixel of the selected subset of pixels. As a further example, in certain embodiments, media modifier 128 may modify original image 118a by deleting each pixel of the selected subset of pixels.

Figure 3B:
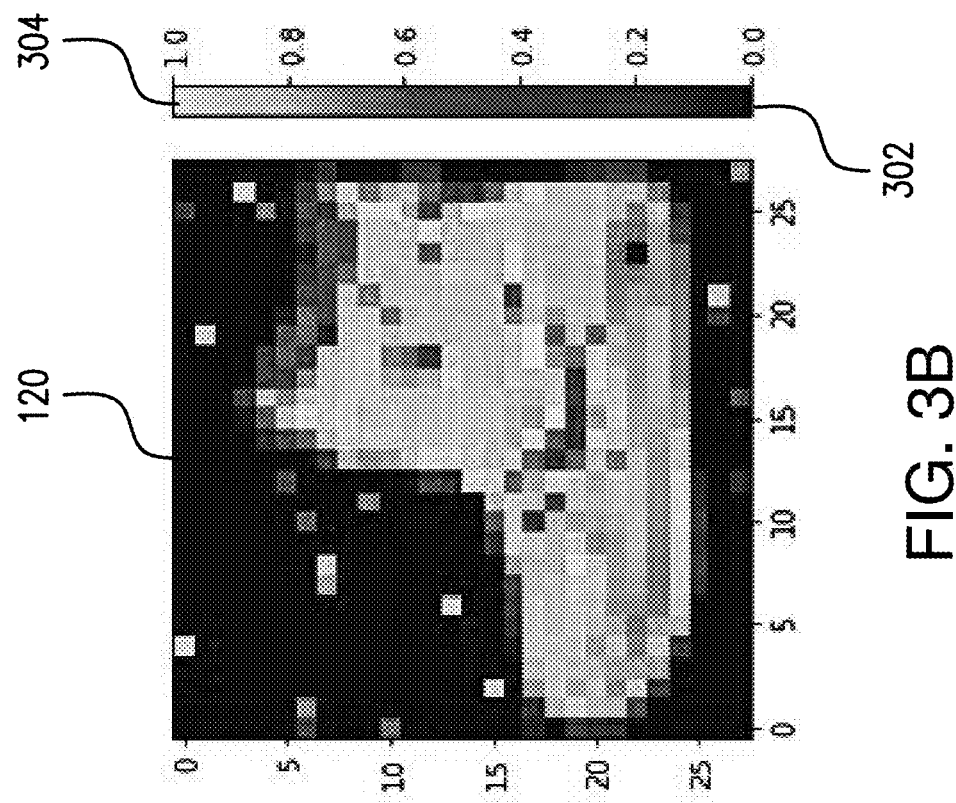
FIG. 3B presents an example of the image presented in FIG. 3A after modification by the digital media distortion tool of the system of FIG. 1.
Figure 3A:
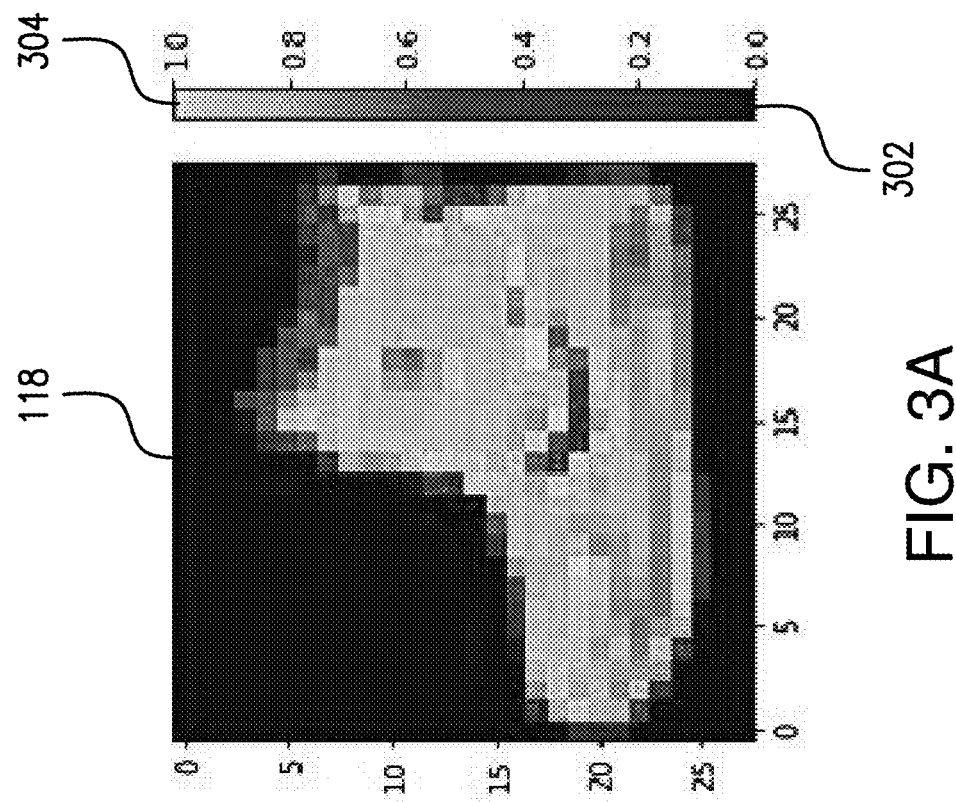
FIG. 3A presents an example of an image before modification by the digital media distortion tool of the system of FIG. 1.

FIGS. 3A and 3B present an example modification of an original image 118. FIG. 3A presents the original image prior to the modification, while FIG. 3B presents the image after modification. As illustrated in FIGS. 3A and 3B, the modified image includes a number of randomly selected pixels in which the brightness values of the pixels have been replaced with randomly selected values lying between the minimum pixel brightness value 302 and the maximum pixel brightness value 304. Replacing the brightness values of each pixel of the subset of selected pixels with randomly selected values may act to distort original image 118 sufficiently such that the accuracy of a generative machine learning algorithm trained using modified image 118 is reduced by at least a minimum amount.

In certain embodiments, media modifier 128 may select new values for each pixel of the subset of pixels selected for modification such that the average brightness of modified media 120b is equal to a target value. In some embodiments, rather than modifying the brightness values of a subset of the pixels of original media 118a, media modifier 128 may modify the brightness values of all of the pixels of original media 118a, such that the average brightness of modified media 120a is equal to the target value. For example, if the average pixel brightness of original media 118a is equal to a value of 100 and the target brightness value is equal to 120, media modified 128 may modify the brightness value of each pixel of original media 118a to generate modified media 120a by multiplying the original brightness value of the pixel by a factor of 1.2. Modification parameters 126 may specify the target value for the average brightness of modified media 120a. As an example, in certain embodiments, modification parameters 126 may include a list of subjects for which protection against synthetic media generation is sought, along with a target average brightness for modified media 120 associated with each subject. Modification parameters 126 may include a different target average brightness for each subject. For example, modification parameters 126 may specify that modified media 120 depicting Person A should have a target average brightness of 100, modified media 120 depicting Person B should have a target average brightness of 120, modified media 120 depicting Location C should have a target average brightness of 140, and modified media 120 depicting Location D should have a target average brightness of 160. Accordingly, media modifier 128 may first identify the subject of original media 118a and then modify the brightness value of each pixel of original media 118a to generate modified media 120a with an average brightness value specified for the identified subject of original media 118a. In certain embodiments, media modifier 128 may identify the subject of original media 118a using a machine learning classification algorithm. Modifying each piece of original media 118 that depicts a given subject such that the average brightness of each piece of modified media 120 is equal to the same target value may act to reduce the accuracy of a generative machine learning algorithm trained using modified media 120 to generate synthetic media of the given subject by misleading the generative machine learning algorithm into associating the given subject with the target average brightness value rather than other features, more specific to the given subject.

b. Videos

If, in step 208 media modifier 128 determines that original media 118a is a video, in step 210 media modifier 128 first separates original video 118a into a set of frames. In step 212, for each frame, media modifier 128 selects a subset of pixels from the set of all the pixels forming the frame. Media modifier 128 may select the subset of pixels from each frame in a similar manner as described above, in the discussion of original images 118. As an example, for each frame, media modifier 128 may randomly select a certain number of pixels in the frame, such that the number of randomly selected pixels is a specified percentage of the total number of pixels in the frame. As another example, for each frame, media modifier 128 may identify a set of pixels forming the subject of the video and then randomly select, for modification, a subset of those pixels. For example, if original video 118a depicts a high-level executive, for each frame of the video, media modifier 128 may first identify those pixels forming the image of the executive (as opposed to the image background) and then randomly select a subset of the identified pixels.

After selecting a subset of pixels from each video frame for modification, in step 214, for each frame, media modifier 128 modifies a value of each pixel of the selected subset of pixels. For example, in certain embodiments, media modifier 128 may modify the brightness and/or the color of each pixel of the selected subset of pixels for each frame in a similar manner as described above, in the discussion of original images 118. As an example, for each video frame and for each pixel of the subset of pixels selected from the video frame, media modifier 128 may use a random number generator to randomly generate a value between 0 and 1, scale the randomly generated value to lie between the minimum brightness value of all of the pixels forming original image 118a and the maximum brightness value of all of the pixels forming original image 118a, and replace the original brightness value of the pixel with the new, randomly generated and scaled value. As another example, media modifier 128 may select new values for the subset of pixels selected for modification such that the average brightness of each frame of modified media 120b is equal to a target value. As another example, media modifier 128 may select new color values for the subset of pixels selecting for modification by randomly selecting new red, green, and/or blue values for the pixels. As another example, media modifier 128 may modify the value of each pixel of the selected subset of pixels by swapping the value of the pixel with the value of another pixel of the selected subset of pixels. As another example, media modifier 128 may delete each pixel of the subset of pixels selected for modification. As a further example, media modifier 128 may modify the brightness values of all of the pixels of each frame of original media 118a, such that the average brightness of each frame of modified media 120b is equal to a target value.

c. Audio Samples

If, in step 216 media modifier 128 determines that original media 118a is an audio sample, in step 218 media modifier 128 selects a subset of audio signals from the set of audio signals forming the audio sample. Media modifier 128 may select the subset of audio signals in any suitable manner. For example, modification parameters 126 may specify a certain percentage of the total number of audio signals to modify, and media modifier 128 may then randomly select a certain number of audio signals to satisfy the specified percentage.

After selecting a subset of audio signals from the set of audio signals forming the audio sample, in step 220 media modifier 128 modifies a value of each audio signal of the selected subset of audio signals. As an example, media modifier 128 may modify the frequency and/or the loudness of each audio signal of the selected subset of audio signals. For example, for each audio signal of the subset of audio signals, media modifier 128 may use a random number generator to randomly generate a value between 0 and 1, scale the randomly generated value so that it lies between the minimum loudness value of all of the audio signals forming original audio sample 118a and the maximum loudness value of all of the audio signals forming original audio sample 118a, and adjust the loudness value of the audio signal to be equal to the new, randomly generated and scaled loudness value. Similarly, for each audio signal of the subset of audio signals, media modifier 128 may use a random number generator to randomly generate a value between 0 and 1, scale the randomly generated value so that it lies between the minimum frequency value of all of the audio signals forming original audio sample 118a and the maximum frequency value of all of the audio signals forming original audio sample 118a, and adjust the frequency value of the audio signal to be equal to the new, randomly generated and scaled frequency value. Replacing the loudness and/or frequency values of each audio signal of the subset of selected audio signals with randomly selected values may act to distort original audio sample 118 sufficiently such that the accuracy of a generative machine learning algorithm trained using modified audio sample 118 is reduced by at least a minimum amount.

In certain embodiments, media modifier 128 may select new values for each audio signal of the subset of audio signals selected for modification such that the average loudness of modified media 120b is equal to a target value. In some embodiments, rather than modifying the loudness values of a subset of the audio signals of original media 118a, media modifier 128 may modify the loudness values of all of the audio signals forming audio sample 118a, such that the average loudness of modified media 120a is equal to a target value. Modification parameters 126 may specify the target value for the average loudness of modified media 120a. As an example, in certain embodiments, modification parameters 126 may include a list of subjects for whom protection against synthetic media generation is sought, along with a target average loudness for modified media 120 associated with each subject. Accordingly, media modifier 128 may first identify the subject of original media 118a (e.g., the individual speaking in the audio sample) and then modify the loudness value of each audio signal of original media 118a to generate modified media 120a with an average loudness value specified for the identified subject of original media 118a. Modifying each piece of original media 118 that includes audio of a given subject speaking such that the average loudness of each piece of modified media 120 is equal to the same target value may act to reduce the accuracy of a generative machine learning algorithm trained using modified media 120 to generate synthetic audio of the given subject by misleading the generative machine learning algorithm into associating the voice of the given subject with the target average loudness value rather than other features, more specific to the given subject.

d. Digital Handwriting Samples

If, in step 222 media modifier 128 determines that original media 118a is a digital handwriting sample, in step 224 media modifier 128 identifies each alpha-numeric character of digital handwriting sample 118a. For example, media modifier 128 may use a character extraction algorithm to separate digital handwriting sample 118a into a set of individual characters and a character recognition algorithm to identify each of the individual characters. For instance, media modifier 128 may identify each of the individual characters using a neural network trained to identify alpha-numeric characters. In step 226, for each identified character in digital handwriting sample 118a, media modifier 128 selects a pixel associated with the identified character. As an example, media modifier 128 may select a pixel located near the identified character. For example, media modifier 128 may determine that the identified character lies within a rectangular box of pixels of digital handwriting sample 118a and select the pixel in the upper right hand corner of the box of pixels, the upper left hand corner of the box of pixels, the lower right hand corner of the box of pixels, or the lower left hand corner of the box of pixels. In step 228 media modifier 128 modifies the brightness of each selected pixel, based on the identified character that the pixel is associated with, according to a mapping between identified characters and brightness values. Such mapping may be specified in modification parameters 126, stored in memory 124. For example, the mapping between identified characters and brightness values may specify that character "A" is associated with a brightness value of 5, "a" is associated with a brightness value of 10, "B" is associated with a brightness value of 15, "c" is associated with a brightness value of 20, etc. Accordingly, if media modifier 128 identifies the character "A" in digital handwriting sample 118a, it may modify a nearby pixel to have a brightness value of 5. Similarly, if media modifier 128 identifies the character "c" in digital handwriting sample 118, it may modify a nearby pixel to have a brightness value of 20. Modifying digital handwriting sample 118 in this manner may act to reduce the accuracy of a generative machine learning algorithm trained using modified media 120 to generate synthetic handwriting associated with a given subject by misleading the generative machine learning algorithm into associating each alpha-numeric character written by the subject with a given nearby pixel brightness value, rather than with other features, specific to the alpha-numeric character written by the given subject.

In certain embodiments, media modifier 128 may treat digital handwriting sample 118a as an image and modify it in a similar manner as described above. For example, media modifier 128 may first select a subset of pixels of the set of pixels forming the digital handwriting image and then modify each pixel of the selected subset. Media modifier 128 may select the subset of pixels in any suitable manner. As an example, media modifier 128 may randomly select one or more pixels from each identified character, to form the subset of pixels. As another example, media modifier 128 may randomly select the subset of pixels from the entire image of the handwriting sample. After media modifier 128 has selected the subset of pixels, media modifier 128 may modify the subset in any suitable manner. As an example, for each pixel of the subset of selected pixels, media modifier 128 may use a random number generator to randomly generate a value between 0 and 1, scale the randomly generated value to lie between the minimum brightness value of all of the pixels forming original handwriting sample 118a and the maximum brightness value of all of the pixels forming original handwriting sample 118a, and replace the original brightness value of the pixel with the new, randomly generated and scaled value. As another example, media modifier 128 may select new color values for the subset of pixels selecting for modification by randomly selecting new red, green, and/or blue values for the pixels. As another example, media modifier 128 may modify the value of each pixel of the selected subset of pixels by swapping the value of the pixel with the value of another pixel of the selected subset of pixels. As another example, media modifier 128 may delete each pixel of the subset of pixels selected for modification.

III. Testing the Choice of Media Modification Parameters

As described above, memory 124 may store a set of media modification parameters 126 that are used by media modifier 128 to modify original media 118 to generate modified media 120. For example, in certain embodiments, media modification parameters 126 may specify (or be used to determine) the subset of data elements from the set of all data elements included in original media 118 that media modifier 128 is to modify. Media modification parameters 126 may also specify (or be used to determine) each new data element value that is used to replace an original data element value when generating modified media 120. In certain embodiments, media modification parameters 126 are chosen to help ensure that a generative machine learning algorithm trained using modified media 120 is less accurate (by a specified amount) at generating synthetic media of a given subject than the same generative machine learning algorithm trained using original media 118. For example, in certain embodiments, modification parameters 126 are chosen such that a first value of an accuracy metric calculated for a first generative machine learning algorithm is less than, by a given factor, a second value of the accuracy metric calculated for a second generative machine learning algorithm, where the first generative machine learning algorithm was created by training a generative model to generate synthetic representations of a subject based on modified media 120 of the subject and the second generative machine learning algorithm was created by training the same generative model to generate synthetic representations of the subject but using original media 118 of the subject rather than modified media 120. Accordingly, in some embodiments, digital media distortion tool 102 may include modification parameter tester 130, which is used to test modification parameters 126 to help ensure that modification parameters 126 are such that the above accuracy metric requirement is satisfied.

Figure 4:
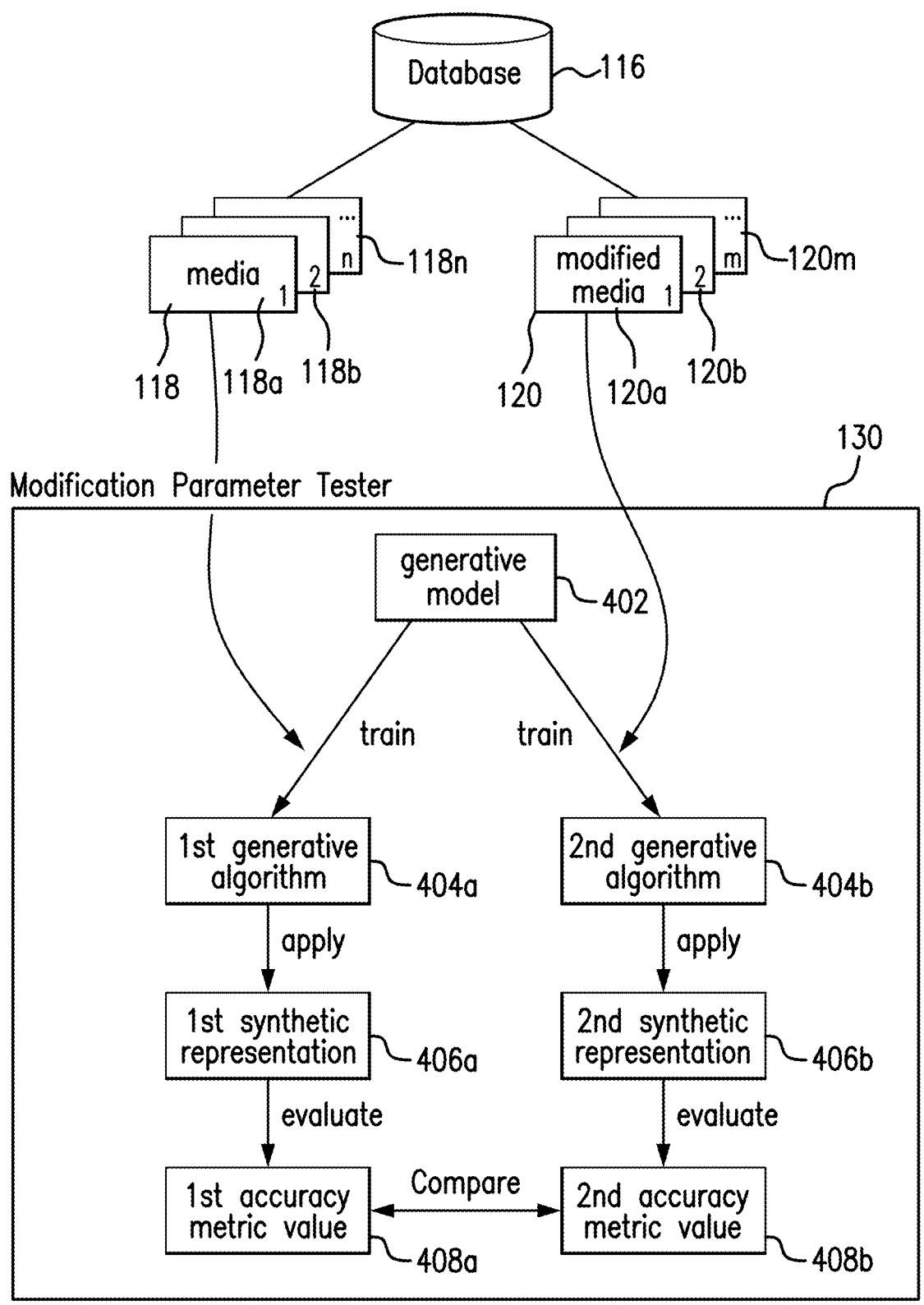
FIG. 4 presents an example of the modification parameter testing component of the digital media distortion tool of the system of FIG. 1.

FIG. 4 presents an example of the operation of modification parameter tester 130. Modification parameter tester 130 may be a sub-processing component of digital media distortion tool 102. For example, modification parameter tester 130 may include non-transitory computer readable instructions stored in memory 124 and executed by processor 122. As illustrated in FIG. 4, modification parameter tester 130 may include one or more generative machine learning models 402. Generative machine learning models 402 may include any machine learning models (including those currently available as well as those that have not yet been developed) capable of generating synthetic representations of a subject after being trained on media associated with the subject. For example, generative machine learning models 402 may include a generative adversarial neural network model, a variational auto encoder model, and/or any other suitable generative model.

Modification parameter tester 130 is configured to train multiple instances of generative machine learning model 402 using both original media 118 and modified media 120. For instance, modification parameter tester 130 is configured to train generative machine learning model 402 using original media 118 that is associated with a given subject, to generate first generative algorithm 404a, trained to produce synthetic representations 406a of the given subject. Similarly, modification parameter tester 130 is configured to train generative machine learning model 402 using modified media 120 that is associated with the given subject, to generate second generative algorithm 404b, trained to produce synthetic representations 406b of the given subject. Both original media 118 and modified media 120 may be stored in database 116. In order to test a given set of modification parameters 126, modification parameter tester 130 trains generative machine learning model 402 to generate second generative algorithm 404b using modified media 120 that has been modified according to the set of modification parameters 402 under consideration. Modification parameter tester 130 may train any number of different generative machine learning models 402, to test modification parameters 126 with respect to such generative models.

After training both first generative machine learning algorithm 404a and second generative machine learning algorithm 404b, modification parameter tester 130 is configured to evaluate the performance of each algorithm by calculating an accuracy metric for the algorithm. For example, modification parameter tester 130 is configured to calculate a first value 408a of the accuracy metric for first generative algorithm 404a and a second value 408b of the same accuracy metric for second generative algorithm 404b. The accuracy metric used by modification parameter tester 130 may be any suitable accuracy metric, designed to evaluate the accuracy of a generative machine learning algorithm in generating synthetic representations of a subject. For example, the accuracy metric could be an average log-likelihood metric, an inception score metric, the Fréchet Inception Distance, a metric related to a Turing-like test, and/or any other suitable metric. As a specific example, in certain embodiments, the accuracy metric may be calculated by presenting one or more users 104a with both multiple instances of synthetic media generated by a generative machine learning algorithm and multiple instances of original media 118 of the subject and measuring the accuracy rate of the users in classifying the media as either real or fake. For example, calculating the first value 408a for the accuracy metric may include (1) generating multiple synthetic representations 406a of the given subject, (2) transmitting these synthetic representations to users 104a, along with multiple pieces of original media 118 associated with the given subject, (3) requesting that users 104a classify each piece of media as real or fake, and (4) determining an accuracy rate of the users' classifications. Similarly, calculating the second value 408b for the accuracy metric may include (1) generating multiple synthetic representations 406b of the given subject, (2) transmitting these synthetic representations to users 104a, along with multiple pieces of original media 118 associated with the given subject, (3) requesting that users 104a classify each piece of media as real or fake, and (4) determining an accuracy rate of the users' classifications.

After calculating the first value 408a for the accuracy metric and the second value 408b for the accuracy metric, modification parameter tester 130 is configured to compare first value 408a and second value 408b to determine whether the chosen modification parameters 126 lead to a sufficient reduction in the accuracy of second generative algorithm 404b as compared to first generative algorithm 404a. As an example, modification parameter tester 130 may be configured to determine whether second value 408b is less than a given factor of first value 408a. For example, modification parameter tester 130 may determine that modification parameters 126 are able to generate modified media 120 that is sufficiently distorted as compared to original media 118 to protect the subjects of the media from the threat of deepfakes, when second value 408b is at least 20% lower than first value 408a.

In certain embodiments, if modification parameter tester 130 determines that second value 408b is not sufficiently reduced as compared with first value 408a, modification parameter tester 130 may adjust modification parameters 126, instruct media modifier 128 to generate additional modified media 120 using the adjusted modification parameters, and subsequently evaluate the new modification parameters. For example, if the original modification parameters specified that 1% of the data elements of original media 118 were to be replaced by randomly generated values, modification parameter tester 130 may adjust modification parameters 126 to specify that 2% of the data elements of original media 118 are to be replaced.

Figure 5:
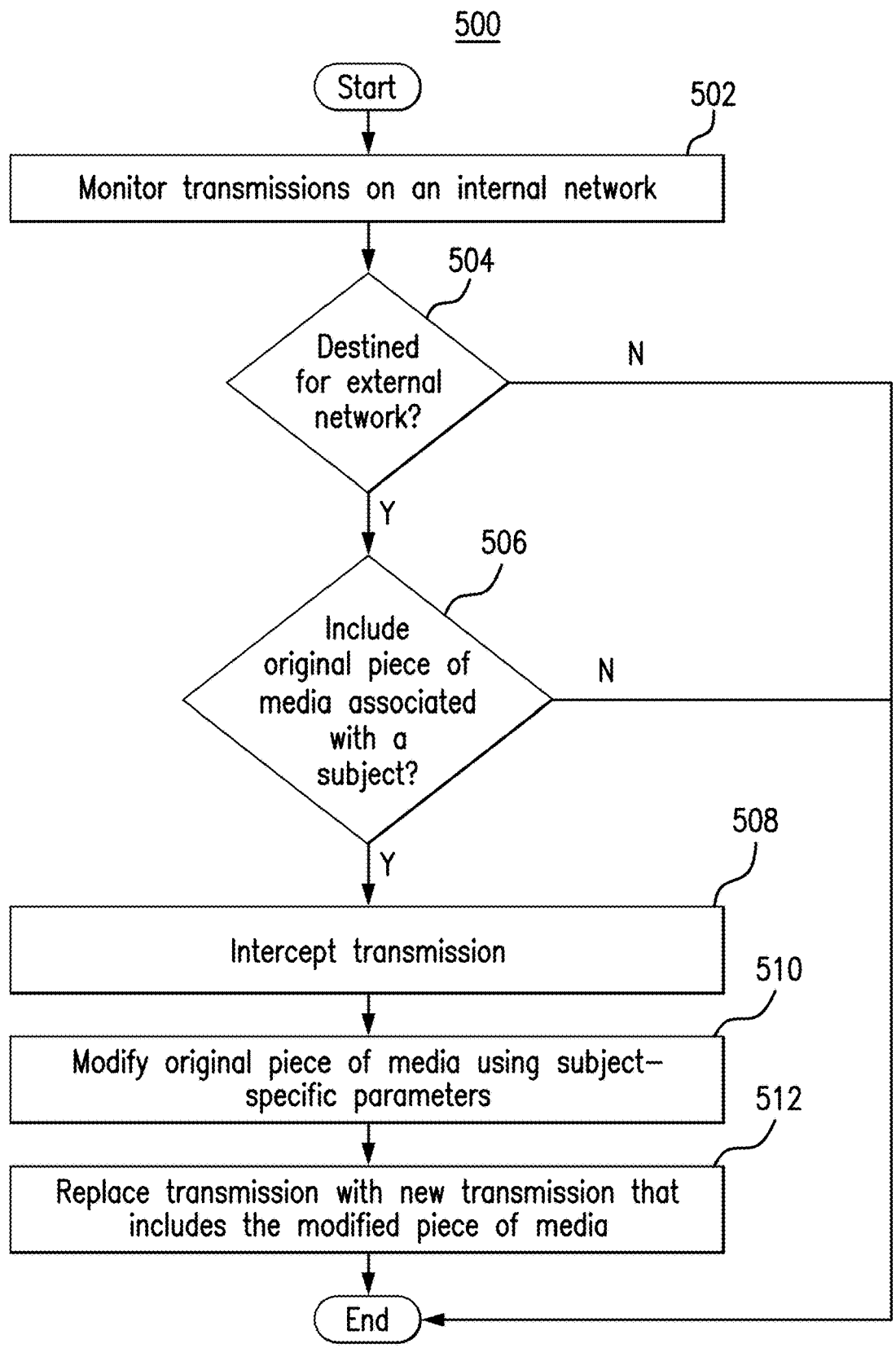
FIG. 5 presents a flowchart illustrating the process by which the digital media distortion tool of the system of FIG. 1 intercepts and modifies a piece of media before the media reaches an external network.

IV. Method of Intercepting and Modifying Original Media Before it Reaches an External Network FIG. 5 presents a flowchart illustrating an example method by which digital media distortion tool 102 intercepts and modifies original media 118 before the media reaches external network 114. In step 502 digital media distortion tool 102 monitors transmissions 132a originating on internal network 114. For example, in certain embodiments, digital media distortion tool 102 may be an edge device, located at the boundary between internal network 114 and external network 116, and configured to monitor outgoing transmissions 132a for original media 118. In step 504 digital media distortion tool 102 determines whether a given transmission 132a is destined for external network 116. If, in step 504, digital media distortion tool 102 determines that transmission 132a is destined for external network 116, in step 506 digital media distortion tool 102 determines whether transmission 132a includes an original piece of media 118a, associated with a given subject. This disclosure contemplates that the given subject may be an individual, an item, a location, and/or any other suitable subject. In certain embodiments, digital media distortion tool 102 first determines whether transmission 132a includes an original piece of media 118a and then determines whether the original piece of media 118a is associated with a given subject. For example, in certain embodiments, digital media distortion tool 102 uses one or more machine learning classification algorithms to determine whether the original piece of media 118a is associated with a given subject.

If, in step 506 digital media distortion tool 102 determines that transmission 132a includes an original piece of media 118a, associated with a given subject, in step 508 digital media distortion tool 102 intercepts transmission 132a before transmission 132a reaches external network 114. In step 510 digital media distortion tool 102 modifies original piece of media 118a to generate modified media 120a using modification parameters 126. In certain embodiments, modification parameters 126 may include parameters specific to the identified subject of original media 118a. For example, original media 118a may be an image of the subject and modification parameters 126 may specify that digital media distortion tool 102 is to modify original media 118a such that the average brightness of the pixels in the image is equal to a given value, assigned to the subject. In step 512 digital media distortion tool 102 replaces transmission 132a with a new transmission 132b destined for external network 114, that includes the modified media 120a.

Modifications, additions, or omissions may be made to method 500 depicted in FIG. 5. Method 500 may include more, fewer, or other steps. For example, steps may be performed in parallel or in any suitable order. While discussed as digital media distortion tool 102 (or components thereof) performing the steps, any suitable component of system 100, such as device(s) 106 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. An apparatus comprising:
a memory; and
a hardware processor communicatively coupled to the memory, the hardware processor configured to:
monitor transmissions originating on an internal network and destined for an external network;
determine that a transmission of the transmissions comprises an original piece of media associated with a subject, the original piece of media comprising a set of data elements, wherein each data element of the set of data elements comprises a value that lies between a minimum value and a maximum value;
in response to determining that the transmission comprises the original piece of media associated with the subject:
intercept the transmission comprising the original piece of media before the transmission reaches the external network;
generate a modified piece of media by applying a media modification process to the original piece of media, the media modification process comprising:
selecting a subset of data elements from the set of data elements of the original piece of media; and
for each data element of the subset of data elements, replacing a value of the data element with a new value of a set of new values, wherein:
the new value lies between the minimum value and the maximum value; and
at least one of the subset of data elements and the set of new values is chosen such that a first value of an accuracy metric calculated for a first generative machine learning algorithm is less than, by a given factor, a second value of the accuracy metric calculated for a second generative machine learning algorithm;
wherein:
the first generative machine learning algorithm comprises a generative model trained to generate synthetic representations of the subject based on media associated with the subject and modified according to the media modification process; and
the second generative machine learning algorithm comprises the generative model trained to generate synthetic representations of the subject based on the media associated with the subject, unmodified according to the media modification process; and
replace the transmission with a new transmission destined for the external network, the new transmission comprising the modified piece of media.

2. The apparatus of claim 1, wherein the original piece of media comprises at least one of:
an image;
a video;
an audio sample; and
a digital handwriting sample.

3. The apparatus of claim 1, wherein the generative model comprises at least one of a generative adversarial neural network and a variational autoencoder model.

4. The apparatus of claim 1, wherein the hardware processor is further configured to, in response to determining that the transmission comprises the original piece of media associated with the subject:
determine a sensitivity level for the subject; and
determine that the sensitivity level for the subject is greater than a threshold, wherein intercepting the transmission comprising the original piece of media before the transmission reaches the external network is performed in response to determining that the sensitivity level for the subject is greater than the threshold.

5. The apparatus of claim 1, wherein:
the original piece of media comprises an image;
the set of data elements comprises a set of pixels; and
generating the modified piece of media comprises replacing a brightness value of each pixel of a subset of pixels of the set of pixels with a new brightness value of a set of new brightness values.

6. The apparatus of claim 5, wherein each new brightness value of the set of new brightness values comprises a randomly selected brightness value.

7. The apparatus of claim 5, wherein the set of new brightness values is chosen such that an average brightness value calculated for the modified piece of media is equal to a specified value.

8. A method comprising:
monitoring transmissions originating on an internal network and destined for an external network;
determining that a transmission of the transmissions comprises an original piece of media associated with a subject, the original piece of media comprising a set of data elements, wherein each data element of the set of data elements comprises a value that lies between a minimum value and a maximum value;
in response to determining that the transmission comprises the original piece of media associated with the subject:
 intercepting the transmission comprising the original piece of media before the transmission reaches the external network;
 generating a modified piece of media by applying a media modification process to the original piece of media, the media modification process comprising:
  selecting a subset of data elements from the set of data elements of the original piece of media; and
  for each data element of the subset of data elements, replacing a value of the data element with a new value of a set of new values, wherein:
   the new value lies between the minimum value and the maximum value; and
   at least one of the subset of data elements and the set of new values is chosen such that a first value of an accuracy metric calculated for a first generative machine learning algorithm is less than, by a given factor, a second value of the accuracy metric calculated for a second generative machine learning algorithm;
  wherein:
   the first generative machine learning algorithm comprises a generative model trained to generate synthetic representations of the subject based on media associated with the subject and modified according to the media modification process; and
   the second generative machine learning algorithm comprises the generative model trained to generate synthetic representations of the subject based on the media associated with the subject, unmodified according to the media modification process; and
 replacing the transmission with a new transmission destined for the external network, the new transmission comprising the modified piece of media.

9. The method of claim 8, wherein the original piece of media comprises at least one of:
an image;
a video;
an audio sample; and
a digital handwriting sample.

10. The method of claim 8, wherein the generative model comprises at least one of a generative adversarial neural network and a variational autoencoder model.

11. The method of claim 8, further comprising, in response to determining that the transmission comprises the original piece of media associated with the subject:
determining a sensitivity level for the subject; and
determining that the sensitivity level for the subject is greater than a threshold, wherein intercepting the transmission comprising the original piece of media before the transmission reaches the external network is performed in response to determining that the sensitivity level for the subject is greater than the threshold.

12. The method of claim 8, wherein:
the original piece of media comprises an image;
the set of data elements comprises a set of pixels; and
generating the modified piece of media comprises replacing a brightness value of each pixel of a subset of pixels of the set of pixels with a new brightness value of a set of new brightness values.

13. The method of claim 12, wherein each new brightness value of the set of new brightness values comprises a randomly selected brightness value.

14. The method of claim 12, wherein the set of new brightness values is chosen such that an average brightness value calculated for the modified piece of media is equal to a specified value.

15. A non-transitory computer-readable medium comprising instructions that are configured, when executed by a hardware processor, to:
monitor transmissions originating on an internal network and destined for an external network;
determine that a transmission of the transmissions comprises an original piece of media associated with a subject, the original piece of media comprising a set of data elements, wherein each data element of the set of data elements comprises a value that lies between a minimum value and a maximum value;
in response to determining that the transmission comprises the original piece of media associated with the subject:
 intercept the transmission comprising the original piece of media before the transmission reaches the external network;
 generate a modified piece of media by applying a media modification process to the original piece of media, the media modification process comprising:
  selecting a subset of data elements from the set of data elements of the original piece of media; and
  for each data element of the subset of data elements, replacing a value of the data element with a new value of a set of new values, wherein:
   the new value lies between the minimum value and the maximum value; and
   at least one of the subset of data elements and the set of new values is chosen such that a first value of an accuracy metric calculated for a first generative machine learning algorithm is less than, by a given factor, a second value of the accuracy metric calculated for a second generative machine learning algorithm;

wherein:
the first generative machine learning algorithm comprises a generative model trained to generate synthetic representations of the subject based on media associated with the subject and modified according to the media modification process; and
the second generative machine learning algorithm comprises the generative model trained to generate synthetic representations of the subject based on the media associated with the subject, unmodified according to the media modification process; and
replace the transmission with a new transmission destined for the external network, the new transmission comprising the modified piece of media.

16. The non-transitory computer-readable medium of claim 15, wherein the generative model comprises at least one of a generative adversarial neural network and a variational autoencoder model.

17. The non-transitory computer-readable medium of claim 15, wherein, when executed by the hardware processor, the instructions are further configured to, in response to determining that the transmission comprises the original piece of media associated with the subject:
determine a sensitivity level for the subject; and
determine that the sensitivity level for the subject is greater than a threshold, wherein intercepting the transmission comprising the original piece of media before the transmission reaches the external network is performed in response to determining that the sensitivity level for the subject is greater than the threshold.

18. The non-transitory computer-readable medium of claim 15, wherein:
the original piece of media comprises an image;
the set of data elements comprises a set of pixels; and
generating the modified piece of media comprises replacing a brightness value of each pixel of a subset of pixels of the set of pixels with a new brightness value of a set of new brightness values.

19. The non-transitory computer-readable medium of claim 18, wherein each new brightness value of the set of new brightness values comprises a randomly selected brightness value.

20. The non-transitory computer-readable medium of claim 18, wherein the set of new brightness values is chosen such that an average brightness value calculated for the modified piece of media is equal to a specified value.

* * * * *